(12) United States Patent
Sun et al.

(10) Patent No.: US 6,910,459 B2
(45) Date of Patent: Jun. 28, 2005

(54) HCCI ENGINE WITH COMBUSTION-TAILORING CHAMBER

(75) Inventors: Ruonan Sun, Ann Arbor, MI (US); Karl H. Hellman, Ann Arbor, MI (US); Charles L. Gray, Pinckney, MI (US)

(73) Assignee: The United States of America as represented by the Administration of the U.S. Environmental Protection Agency, Washington, DC (US)

( * ) Notice: Subject to any disclaimer, the term of this patent is extended or adjusted under 35 U.S.C. 154(b) by 0 days.

(21) Appl. No.: 10/448,417

(22) Filed: May 30, 2003

(65) Prior Publication Data

US 2004/0237928 A1 Dec. 2, 2004

(51) Int. Cl.⁷ ........................ F02M 19/02; F02M 19/10
(52) U.S. Cl. ........................ 123/275; 123/292; 123/435
(58) Field of Search ................ 123/254, 258, 123/267, 275, 292, 525, 526, 27 GE, 435

(56) References Cited

U.S. PATENT DOCUMENTS

| | | | | |
|---|---|---|---|---|
| 5,054,443 A | * | 10/1991 | Kawamura | 123/292 |
| 5,067,458 A | * | 11/1991 | Bailey | 123/292 |
| 5,156,123 A | * | 10/1992 | Kawamura | 123/292 |
| 5,224,450 A | * | 7/1993 | Paul et al. | 123/292 |
| 5,237,964 A | * | 8/1993 | Tomoiu | 123/292 |
| 5,887,566 A | * | 3/1999 | Glauber et al. | 123/27 GE |
| 6,427,643 B1 | * | 8/2002 | Dixon | 123/48 A |
| 6,694,944 B2 | * | 2/2004 | Agama et al. | 123/292 |

\* cited by examiner

*Primary Examiner*—Erick Solis
(74) *Attorney, Agent, or Firm*—Lorusso, Loud & Kelly

(57) ABSTRACT

An internal combustion engine is adapted for operation with homogeneous combustion and compression ignition. The engine includes plural cylinders with the piston in each cylinder defining the main combustion chamber and connected to a crankshaft for reciprocating motion rotatably driving the crankshaft. An auxiliary combustion chamber and an inlet passage are formed in the engine head for each of the cylinders with a control valve for controlling communication between the main combustion chamber and the auxiliary combustion chamber and an inlet valve for controlling communication between the main combustion chamber and the inlet passage. The inlet valve is driven with rotation of the crankshaft, while the drive for the combustion control valve is independent of angular position of the crankshaft and has its own controller for timing its opening and closing to provide controlled homogeneous combustion.

15 Claims, 2 Drawing Sheets

HCCI ENGINE WITH COMBUSTION-TAILORING CHAMBER

BACKGROUND OF THE INVENTION

This invention relates to a method and apparatus for controlling the operation of Homogeneous Charge Compression Ignition (HCCI) engines over a wide range of speeds and loads. HCCI is a type of combustion in which a premixed fuel air mixture is brought to auto-ignition near the end of the compression stroke. Engines using HCCI combustion have the potential to meet future stringent emission standards with increased fuel efficiency and without penalty in production cost. Engines operating with HCCI combustion can be used for passenger cars, buses, trucks as well as non-road and off-road applications.

The Prior Art

HCCI has been identified for many years as a distinct combustion phenomenon. When certain conditions are met within a hot homogenous charge, auto-ignition would occur at many different points simultaneously and without flame propagation. Many studies have suggested that the HCCI is controlled by the onset of dissociation of the hydrogen peroxide, which is a function of many factors such as time-temperature and pressure history, fuel property, fuel/air ratio, heat transfer to the combustion chamber walls and the residential gas fraction.

The difficulties in operating engines using HCCI are starting and combustion phasing and control, especially during transient operations.

The potential benefits of operating an engine in a HCCI mode have been recognized for many years. For example, the potential for HCCI was discussed eighteen years ago in the technical literature SAE Paper 830264. In general, exhaust gas recirculation (EGR) has been used to control intake temperature, which in turn controls the start of combustion (SOC). U.S. Pat. No. 6,092,512 offers a good summary of such efforts. The problem with the EGR control method is that response time is too long. Many cycles are required to adjust the EGR rate to achieve the desired SOC. Reported HCCI operation using EGR as control has been limited to a few steady state conditions for a given engine. Because of this, no commercial HCCI engines using EGR as control have been mass-produced.

U.S. Pat. No. 6,095,102 suggested using pilot fuel injection to initiate HCCI. This is generally applicable to dual fuel engines.

U.S. Pat. No. 5,832,880 suggested using in-cylinder water injection as a means to control HCCI operation.

U.S. Pat. Nos. 5,101,776 and 6,135,086 teach varying the compression ratio limited to a high and a low compression ratio, to control the gasoline engine knock. The start of combustion in such engines is controlled by a spark.

U.S. Pat. No. 5,476,072 suggested a supplemental cylinder head assembly for operation of an engine in a HCCI mode. The assembly provides a movable accumulator piston, which operates as a passive device, to suppress the combustion knock.

U.S. Pat. No. 5,970,944 suggested use of a control valve to provide a predetermined timing for the combustion by controlling the exposure of the natural gas, which is stored in the auxiliary chamber, to the hot air in the main chamber. The control valve has a fixed timing for opening for all cycles, which is dependent on the angular position of the piston or crankshaft, and is not adjustable on a cycle-to-cycle basis to optimize for engine efficiency.

SUMMARY OF THE INVENTION

This invention utilizes a variable compression ratio along with EGR to control HCCI operation. A variable compression ratio is achieved by using an auxiliary volume connected to the main combustion chamber through a port with a control valve located in the port. The timing of the control valve, which can be adjusted from one engine cycle to another, if necessary, enables the present invention to provide much faster response as compared to the prior art.

In the present invention, the control valve is operated in such a way that the temperature and pressure at the end of the compression can be varied from one engine cycle to another, if necessary. This is equivalent to a continuous variation of compression ratio over a relatively wide range. In a preferred embodiment, the control valve is operated hydroelectrically with such precision that it controls the timing of combustion, and can adjust the timing of the combustion so that combustion occurs at a time during the engine cycle that is at or near the optimum value for engine efficiency.

This invention varies the time-temperature and/or pressure history to which the charge is exposed in order to compensate for changes in other factors such as fuel properties, fuel/air ratio, heat transfer, etc., such that the onset of HCCI is kept at an optimized crankangle position relative to Top Dead Center (TDC). This is necessary for steady state operation and crucial for transient operations when the fuel quantity and other variables undergo large variations.

Accordingly, the present invention provides an internal combustion engine with homogeneous combustion and compression ignition, which engine includes an engine block with plural cylinders which are closed at one end by an engine head. A piston is mounted within each cylinder and defines the main combustion chamber within that cylinder. The pistons are connected to a crankshaft for reciprocating motion rotatably driving the crankshaft. An auxiliary combustion chamber and an inlet passage, both formed in the engine head, are provided for each of the plural cylinders. A combustion control valve opens and closes communication between the main combustion chamber and the auxiliary combustion chamber under control of a controller which times its opening and closing, independently of angular position of the crankshaft, and which provides an appropriate temperature versus time history for the charge to enable the best timing of the homogeneous combustion event. An inlet valve opens and closes communication between the main combustion chamber and the inlet passage and is provided with drive means for operating same in conjunction with the rotation of the crankshaft.

In the preferred embodiment both the combustion control valve and the inlet valve are poppet vales and the controller which operates the combustion control valve is an electro-hydraulic device. Preferably, the controller receives real time input, e.g., temperature or pressure, for cycle-to-cycle adjustment of the timing of opening and closing of the combustion control valve to maintain, for a given engine speed, combustion timing for peak operating efficiency. The combustion timing may operate, for example, on the basis of real time combustion pressure measurement, on a given engine cycle with feed back control so as to adjust the timing of closing of the combustion control valve to provide for an optimum peak pressure relative to TDC (for a given engine speed) in the next subsequent cycle. In this manner, the controller in effect utilizes feed back control to control the combustion temperature versus time profile for each combustion event.

In the preferred embodiments, an ignition device, e.g., a glow plug or spark plug, is provided in that portion of the engine head defining the auxiliary combustion chamber.

Accordingly, the preferred embodiments include a sensor which provides the controller with real time input of an engine operating parameter which it monitors, e.g., combustion pressure, so that the controller can adjust the timing of operation of the combustion control valve to provide, for a given engine speed, a peak combustion pressure, relative to TDC, predetermined to give optimum efficiency at that engine speed. This is equivalent to control of the combustion temperature versus time (or versus crank angle) profile predetermined to give optimum efficiency for a given engine speed.

In the preferred embodiment, the engine is equipped with a device to increase the inlet manifold pressure, such as a turbocharger or a supercharger. Naturally aspirated versions of the invention are also possible. In the preferred embodiment the engine is equipped with an EGR system of the low pressure type, although high pressure EGR could also be used. The EGR system consists of EGR passages, heat exchangers and control valves which deliver, condition and control the EGR flow to the engine.

The present invention also provides a method for operating an engine with homogenous combustion compression ignition utilizing the above-described apparatus.

The present invention offers several advantages over the prior art. First it enables HCCI engine operation over a wide range of speeds and loads so that the engine is commercially useful. Secondly, the major components that form the apparatus have proven able to survive an engine environment in practical use. For example, the electro-hydraulic valve control system is very similar to that of the hydraulically actuated electronic unit injector (HEUI) used on some commercial engines. The flow requirement in this invention is much less demanding than the HEUI system. In contrast, the mechanisms of the prior art have yet to be proven to be practical. In addition, the present invention provides for fast control of the HCCI combustion process, since the timing of the opening and closing of the combustion control valve can be changed from one engine cycle to the next.

DESCRIPTION OF THE PREFERRED EMBODIMENTS

Figure 1:
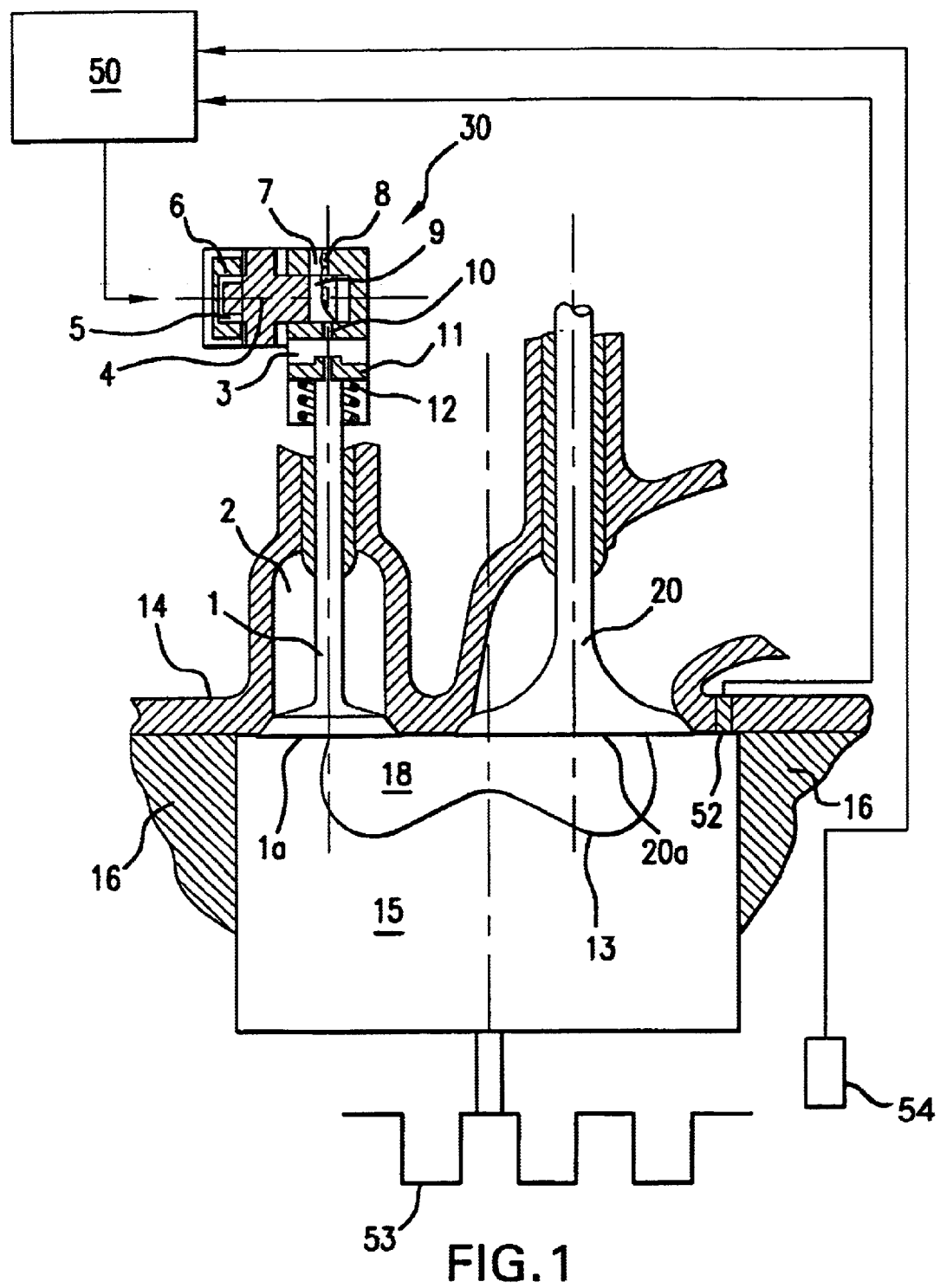
FIG. 1 is a schematic cross-section of a first embodiment of the present invention.

FIG. 1 shows a first preferred embodiment of the present invention in the form of a reciprocating internal combustion engine which includes a combustion-tailoring chamber (CTC) 2 in the cylinder head 14. Piston 15 is provided with a piston bowl 13 in its face forming the main combustion chamber. The volume of the chamber 2 can be from 5 to 70% of the volume of piston bowl 13. There is a valve 1 between the chamber 2 and the main combustion chamber. The area of the surface 1a of valve 1 is equal to or smaller than that of surface 20a of the intake valve 20. The piston 15 is one of plural pistons drivably connected to an engine crankshaft 53. A sensor 52 monitors combustion chamber pressure and a sensor 54 monitors engine speed and/or crank angle.

The valve 1 is controlled electro-hydraulically by a control unit 30 responsive to signals from a controller 50. Hydraulic fluid with pressure on the order of 2000 psi is provided to the control unit inlet 7. To open the valve 1, an open and hold current is provided to the magnet 5, which opens valve 4. The pressured hydraulic fluid then flows through passage 9 into chamber 3 and drives the valve 1 to open. Piston 11 seals the hydraulic fluid and also guides the valve 1. The lift of the valve 1 is about 2 to 4 mm for a 0.5 L per cylinder passenger car engine. The dynamic flow rate required to open the valve 1 is about 2 to 3 GPM. The closing of the valve 1 requires valve 4 in a position to bleed the hydraulic fluid from the chamber 3 through passages 10, 9 and 8. This is achieved with zero current to magnet 5 and with the help of spring 6 to position valve 4. The spring 12 may also help to close the valve 1.

The time needed to open and close the valve 1 is on the order of 1 msec. Since the valve 1 is controlled electrohydraulically, the events of valve opening or closing can be independent of the engine events and crank position. By varying the valve 1 opening and closing timing and duration, the CTC 2 can contain a wide range of the total cylinder charge, thus changing the temperature and pressure history the charge undergoes during the intake process. In other words, the temperature and pressure can be altered to achieve optimized ignition and combustion phasing for homogeneous charge of different air/fuel ratios, EGR rates, engine speeds, and engine inlet, coolant and oil temperatures. This optimization can be done on a cycle-to-cycle basis with feedback of a knock sensor, a cylinder pressure sensor, or any other sensor which detects the start of the combustion or other combustion characteristics, such as the rate of change of combustion chamber pressure or the location of peak pressure or the location of events corresponding to the burn rate of the charge. In this way, optimization can be provided for each point on the entire engine operating map, both for steady state and transient operation. In the preferred embodiment shown in FIG. 1, the controller 50 receives signals from a pressure transducer 52 and from a sensor 54 for engine speed and/or crank angle, determines peak combustion pressure and the timing of the peak combustion pressure relative to TDC, and controls the timing of operation of combustion control valve 1 in a subsequent cycle, preferably in the next combustion cycle, to provide a combustion timing for optimum efficiency at the detected engine speed.

The fuel/air equivalent ratio can range from very lean to one. The exhaust gas recirculation (EGR) rate can be up to 60%. The intake air boost can be up to 2.5 with the help of the above-mentioned turbo charger or supercharger.

Figure 2:
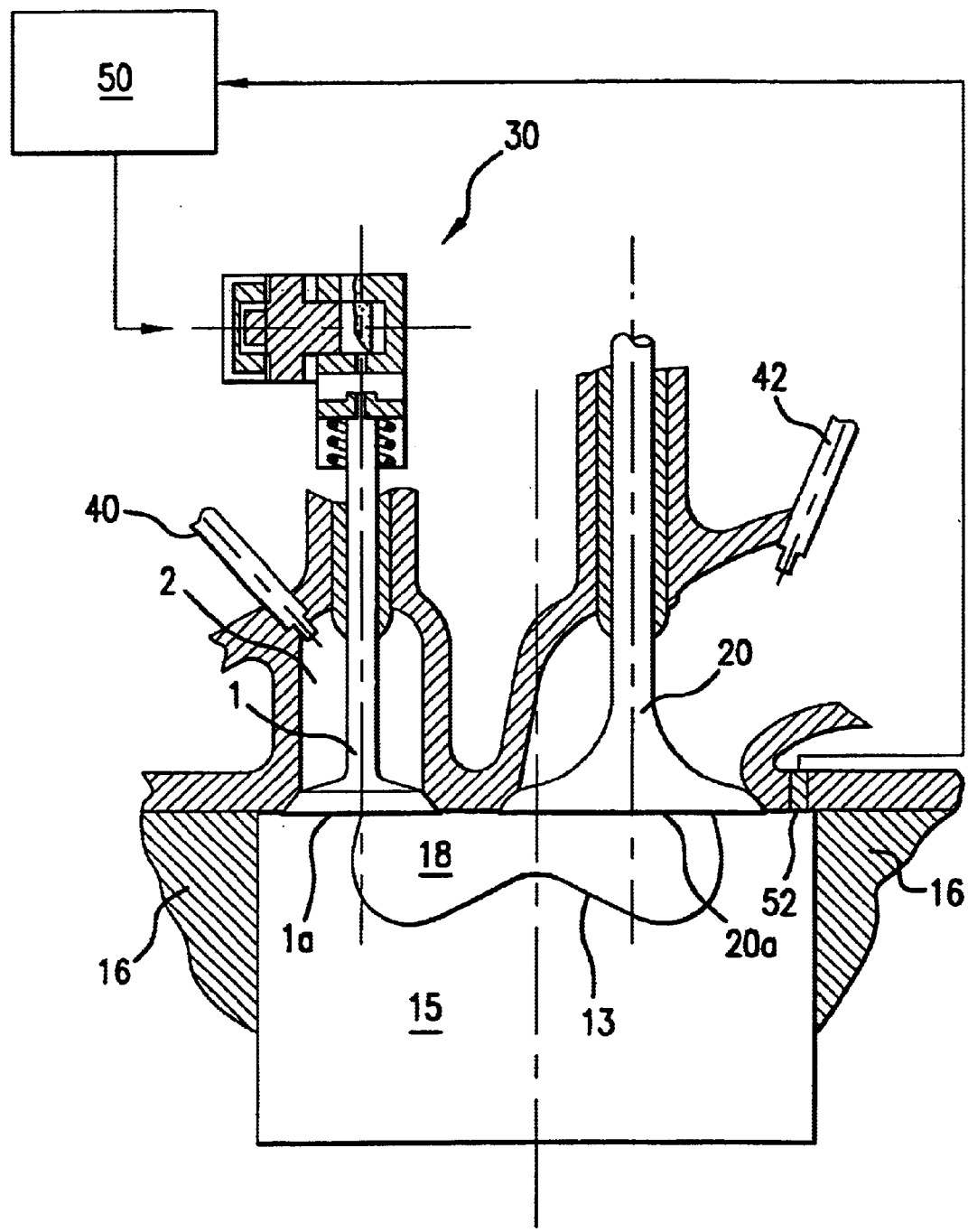
FIG. 2 is a schematic cross-section of a second embodiment of the present invention.

A second embodiment of the invention is shown in FIG. 2 as additionally including a fuel injector 40 which can inject fuel directly into the CTC 2. In general, injector 40 is a low pressure and low cost pintle type fuel injector.

One example of operation of the embodiment is as follows: Inject a small amount of fuel (pilot fuel) into CTC 2 through injector 40. The CTC 2 is heat insulated or equipped with a glow plug, if necessary. The gas temperature and pressure in the CTC 2 is such that ignition will occur following a delay. The opening of the valve 1 is timed to be just prior to or near the ignition. This allows the hot combustion intermediate species or product to inject into the main chamber and ignite the homogeneous charge which includes the majority of the fuel (major fuel) portion. The major fuel portion is generally introduced through a port injector 42 during the intake process. The pilot fuel can be the same as the major fuel, i.e., both are diesel or can be different, i.e., the pilot fuel can be diesel and the major fuel can be natural gas.

Another example of operation of the second embodiment is as follows: Inject all the fuel into CTC 2 through injector 40 while the valve 1 is closed. Keep the gas temperature and pressure in CTC 2 such that no ignition will occur and only fuel evaporation and mixing will occur inside the CTC 2. Open the valve 1 near the compression TDC. The homogeneous charge from the CTC 2 will meet the hot gas in the main chamber and ignition will occur.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An internal combustion engine with homogeneous charge compression ignition, said internal combustion engine comprising:
    an engine block with plural cylinders formed therein and closed at one end by an engine head;
    a piston mounted within each cylinder defining a main combustion chamber therein and connected to a crankshaft for reciprocating motion rotatably driving the crankshaft;
    an auxiliary combustion chamber and an inlet passage, formed in the engine head, for each of said plural cylinders, said auxiliary combustion chamber providing an auxiliary volume connected to the main combustion chamber for varying the compression ratio;
    a combustion control valve for opening and closing communication between the main combustion chamber and the auxiliary combustion chamber to vary the compression ratio for combustion within the main combustion chamber;
    an inlet valve for opening and closing communication between the main combustion chamber and the inlet passage;
    means for driving the inlet valve between open and closed positions with rotation of the crankshaft; and
    controller means for controlling operation of said combustion control valve, independently of angular position of said crankshaft, to vary the compression ratio and providing timing for homogeneous charge compression ignition combustion within the main combustion chamber.

2. The internal combustion engine of claim 1 wherein said combustion control valve and said inlet valve are poppet valves.

3. The internal combustion engine of claim 1 wherein said means for operating said combustion control valve is electro-hydraulic.

4. An internal combustion engine according to claim 1 further comprising a main fuel injector for injecting a major portion of a fuel charge for a combustion event into the inlet passage for a cylinder; and
    a secondary fuel injector for injecting a minor portion of the fuel charge for the combustion event into the auxiliary combustion chamber.

5. An internal combustion engine according to claim 1 wherein said piston has a surface facing said head with a bowl-like depression formed therein and wherein the auxiliary combustion chamber has a volume which is 5 to 70% of the volume of said bowl-like depression.

6. An internal combustion engine according to claim 1 further comprising an ignition device mounted in said engine head and extending into said auxiliary combustion chamber.

7. The internal combustion engine according to claim 1 further comprising:
    a sensor providing said controller with real time input of an engine operating parameter; and
    wherein the controller means utilizes the real time input for feedback control of timing of said operation of said combustion control valve to provide the homogeneous combustion at optimum efficiency.

8. The internal combustion engine according to claim 7 wherein said sensor is a pressure sensor and wherein said controller means determines peak combustion pressure, relative to crank angle for a combustion event, and controls the timing of operation of the combustion control valve in a subsequent combustion event on the basis of the determined peak combustion pressure.

9. The internal combustion engine according to claim 7 wherein said controller means provides cycle-to-cycle feedback control of the timing of each combustion event.

10. A method for operating an engine with homogeneous combustion and compression ignition, said method comprising:
    providing an engine block with plural cylinders formed therein, each of the cylinders having a open end and a piston mounted therein for reciprocating motion driving a crankshaft, the piston defining a main combustion chamber within a cylinder, a head covering the open ends of the cylinder and providing an inlet passage and an auxiliary combustion chamber for each cylinder with a combustion control valve controlling communication between the main combustion chamber and the auxiliary combustion chamber and an inlet valve for controlling communication between the inlet passage and the main combustion chamber;
    driving the inlet valve off of the crankshaft; and
    controlling operation of the combustion control valve independently of angular position of the crankshaft, utilizing the auxiliary combustion chamber as an auxiliary volume, to vary the compression ratio and to provide homogeneous charge ignition combustion in the main combustion chamber.

11. The method according to claim 10 further comprising initiation of ignition within the auxiliary combustion chamber.

12. The method according to claim 10 further comprising:
    sensing an engine operating parameter in real time; and
    wherein the controlling of operation of the combustion control valve is feedback control of the timing of the opening and/or closing of the combustion control valve, responsive to the sensed engine operating parameter, to provide the homogeneous combustion at optimum efficiency.

13. The method according to claim 12 wherein the sensed engine operating parameter is combustion chamber pressure.

14. The method according to claim 10 wherein operation of the combustion control valve is with cycle-to-cycle feedback control of the timing of each combustion event.

15. The method according to claim 10 further comprising introducing a fuel charge for each combustion event as two separate portions, including introducing a major portion of the fuel charge for a combustion event into an inlet passage for a cylinder and introducing a minor portion of the fuel charge for the same combustion event directly into the auxiliary combustion chamber for the same cylinder.

* * * * *